US011192589B2

United States Patent
Okamoto et al.

(10) Patent No.: US 11,192,589 B2
(45) Date of Patent: Dec. 7, 2021

(54) SUBFRAME STRUCTURE OF FRONT SUSPENSION

(71) Applicant: MAZDA MOTOR CORPORATION, Hiroshima (JP)

(72) Inventors: Hiroyuki Okamoto, Aki-gun (JP); Fumihiro Kurohara, Aki-gun (JP); Norio Asano, Aki-gun (JP); Hiroto Kido, Aki-gun (JP); Yasunori Takahara, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/930,230

(22) Filed: Jul. 15, 2020

(65) Prior Publication Data
US 2021/0024137 A1    Jan. 28, 2021

(30) Foreign Application Priority Data
Jul. 24, 2019    (JP) .............................. JP2019-135936

(51) Int. Cl.
| | | |
|---|---|---|
| *B62D 21/15* | (2006.01) | |
| *B60G 7/00* | (2006.01) | |
| *B60K 8/00* | (2006.01) | |
| *B62D 21/11* | (2006.01) | |

(52) U.S. Cl.
CPC ........... *B62D 21/155* (2013.01); *B60G 7/001* (2013.01); *B60K 8/00* (2013.01); *B62D 21/11* (2013.01)

(58) Field of Classification Search
CPC ...... B62D 21/155; B62D 21/11; B62D 27/06; B60G 7/001; B60G 2204/1431; B60G 2206/016; B60G 7/02; B60G 7/008; B60K 8/00
See application file for complete search history.

(56) References Cited

U.S. PATENT DOCUMENTS

| | | | | |
|---|---|---|---|---|
| 7,393,016 | B2 * | 7/2008 | Mitsui .................... | B62D 25/08 180/232 |
| 8,532,881 | B2 * | 9/2013 | Ostling ................. | F16B 31/005 701/45 |
| 9,150,252 | B2 * | 10/2015 | Yasui ................... | B62D 25/082 |

(Continued)

FOREIGN PATENT DOCUMENTS

JP         2016188054 A    11/2016

*Primary Examiner* — Darlene P Condra
(74) *Attorney, Agent, or Firm* — Studebaker & Brackett PC (57) ABSTRACT

A subframe structure of a front suspension that leads a subframe and a vehicle driving apparatus to the lower side after separation of a rear portion of the subframe due to a frontal collision without increasing weight and parts. A subframe structure of the front suspension provides a subframe that supports a vehicle driving apparatus in a mounting manner, and a rear portion of the subframe is mounted on a lower portion of a vehicle body via a fastening member. Fastening between the subframe and the fastening member is configured such that the rear portion of the subframe is separated when a collision load to a vehicle rear side is applied to the subframe. A leading guide portion that abuts against the fastening member and leads the subframe to a lower side after separation from the fastening member is integrally formed on the rear portion of the subframe.

5 Claims, 9 Drawing Sheets

(56) References Cited

U.S. PATENT DOCUMENTS

| | | | |
|---|---|---|---|
| 2004/0046381 A1* | 3/2004 | Yoshida | B62D 21/11 280/784 |
| 2012/0286543 A1* | 11/2012 | Lee, III | B62D 21/11 296/204 |
| 2014/0312654 A1* | 10/2014 | Komiya | B62D 25/082 296/187.09 |
| 2019/0322164 A1* | 10/2019 | Sasaki | B62D 21/155 |
| 2020/0102014 A1* | 4/2020 | Sakai | B60R 19/34 |

* cited by examiner

SUBFRAME STRUCTURE OF FRONT SUSPENSION

BACKGROUND

Technical Field

The present disclosure relates to a subframe structure of a front suspension in which a subframe that supports a vehicle driving apparatus such as an engine in a mounting manner is provided and a rear portion of the subframe is mounted on a lower portion of a vehicle body via a fastening member.

Background Art

Hitherto, in order to suppress excessive load transmission to a dash panel at the time of a vehicle frontal collision, it has been preferred to employ a structure as follows. Put plainly, a structure in which a part of a vehicle driving apparatus such as an engine is supported by a subframe below the vehicle driving apparatus in a mounting manner, and a rear portion of the subframe is separated from a body such as a front side frame at the time of a frontal collision has been employed. By this structure, the engine can move toward the lower side together with the subframe when the rear portion of the subframe is separated from the body, and hence excessive load transmission of the engine to the dash panel can be suppressed.

The movement of the rear portion of the subframe to the lower side after being separated from the body described above can be attained with use of an inclined portion (see a kick-up portion of the front side frame) of a body frame disposed from a lower portion of the dash panel to the front portion of a floor panel. However, the inclined portion cannot be used when a portion for fastening the rear portion of the subframe to the vehicle body is positioned to be closer to the rear side than the inclined portion due to the layout, for example.

Thus, a way of separately forming the inclined portion with use of a dedicated member on the rear side of the portion for fastening the rear portion of the subframe to the vehicle body is conceived. In this case, the dedicated member is separately needed, the weight increases and the number of parts increases, and the productivity decreases. Therefore, there has been room for improvement.

Incidentally, Japanese Patent Laid-Open No. 2016-188054 discloses a configuration in which a tube nut integrally formed with a lower wall horizontal portion of an inclined portion of a front side frame is provided, and a rear portion of a subframe is mounted with use of a bolt to be fastened with the tube nut. The configuration is a vehicle front portion structure in which the tube nut is broken and the subframe is separated from the front side frame at the time of a vehicle frontal collision.

However, in the configuration disclosed in Japanese Patent Laid-Open No. 2016-188054, the movement of the rear portion of a front subframe to the lower side after the separation from the body (see the front side frame) uses the inclined portion of the front side frame disposed from the lower portion of the dash panel to the front portion of the floor panel, and hence there are problems similar to those described above.

SUMMARY

Thus, the present disclosure provides a subframe structure of a front suspension capable of leading a vehicle driving apparatus to the lower side together with a subframe after the separation of a rear portion of the subframe due to a frontal collision without increasing the weight and the number of parts.

In a subframe structure of a front suspension according to the present disclosure, a subframe that supports a vehicle driving apparatus in a mounting manner is provided, a rear portion of the subframe is mounted on a lower portion of a vehicle body via a fastening member, fastening between the subframe and the fastening member is configured such that the rear portion of the subframe is separated when a collision load to a vehicle rear side is applied to the subframe, and a leading guide portion that abuts against the fastening member and leads the subframe to a lower side after separation from the fastening member is integrally formed on the rear portion of the subframe.

The vehicle driving apparatus described above may be an engine or may be a motor unit of an electrically driven vehicle. According to the configuration above, when the collision load to the vehicle rear side is applied to the subframe, the rear portion of the subframe is separated from the fastening member. After the separation of the rear portion, the leading guide portion abuts against the fastening member and leads the subframe to the lower side, and hence the vehicle driving apparatus falls to the lower side together with the subframe.

Therefore, the subframe and the vehicle driving apparatus can be led to the lower side after the separation of the rear portion of the subframe due to a frontal collision, and the excessive load transmission to the dash panel at the time of a frontal collision can be suppressed without increasing the weight and the number of parts even when the rear portion of the subframe is not mounted on the inclined portion of the body.

According to one embodiment of the present disclosure, the fastening member is fastened to a vehicle body side in an inseparable manner and is fastened to a subframe side in a separable manner via a slit portion provided on a front side of the fastening member, and the leading guide portion that abuts against the fastening member and is inclined to a lower rear side is integrally formed on a front side of the fastening member on the subframe side.

According to the configuration above, the fastening state of the fastening member to the vehicle body side is maintained at the time of a vehicle frontal collision. When the rear portion of the subframe moves to the rear side, the fastening member relatively moves to a front side via the slit portion and is separated from the rear portion of the subframe. As a result, the rear portion of the subframe comes off from the fastening member.

After the separation between the rear portion of the subframe and the fastening member, the subframe is led to the lower side by the abutment of the leading guide portion inclined to the lower rear side against the fastening member. As described above, the facilitation of the separation of the rear portion of the subframe from the fastening member by the slit portion, and the facilitation of the abutment of the fastening member against the leading guide portion can be compatible.

According to one embodiment of the present disclosure, the leading guide portion is formed such that an opening is placed between the leading guide portion and the fastening member on the subframe side. According to the configuration above, by the formation of the opening, the necessary space needed when the fastening member is separated from the rear portion of the subframe via the slit portion can be secured. Therefore, the relative front side movement of the fastening member can be secured, and the weight of the front subframe can be saved by the formation of the opening.

According to one embodiment of the present disclosure, a lower arm from which a front wheel is suspended is provided, the lower arm has a rear portion supported by a suspension arm mounting bracket in which a bush is fitted, a vehicle-width-direction inner side of the suspension arm mounting bracket is mounted to the subframe, and the suspension arm mounting bracket has a rear portion on which a portion in which the fastening member for the rear portion of the subframe with respect to the vehicle body is disposed and the leading guide portion are integrally formed.

According to the configuration above, the portion in which the fastening member is disposed and the leading guide portion are integrally formed on the rear portion of the suspension arm mounting bracket. Therefore, the portion in which the fastening member is disposed and the leading guide portion can be formed without causing the subframe itself to become complicated.

According to the present disclosure, such an effect that the vehicle driving apparatus can be led to the lower side together with the subframe after the separation of the rear portion of the subframe due to a frontal collision without increasing the weight and the number of parts even when the rear portion of the subframe is not mounted on the inclined portion of the body is provided.

BRIEF DESCRIPTION OF THE DRAWINGS

FIG. 2 is an arrow cross-sectional view of a main part taken along line A-A in

FIG. 1;

DETAILED DESCRIPTION

Leading a vehicle driving apparatus to the lower side together with a subframe after the separation of a rear portion of the subframe due to a frontal collision without increasing the weight and the number of parts, even when the rear portion of the subframe is not mounted on an inclined portion of a body, is attained by a configuration in which a subframe that supports a vehicle driving apparatus in a mounting manner is provided, a rear portion of the subframe is mounted on a lower portion of a vehicle body via a fastening member, fastening between the subframe and the fastening member is configured such that the rear portion of the subframe is separated when a collision load to a vehicle rear side is applied to the subframe, and a leading guide portion that abuts against the fastening member and leads the subframe to a lower side after separation from the fastening member is integrally formed on the rear portion of the subframe.

Figure 1:
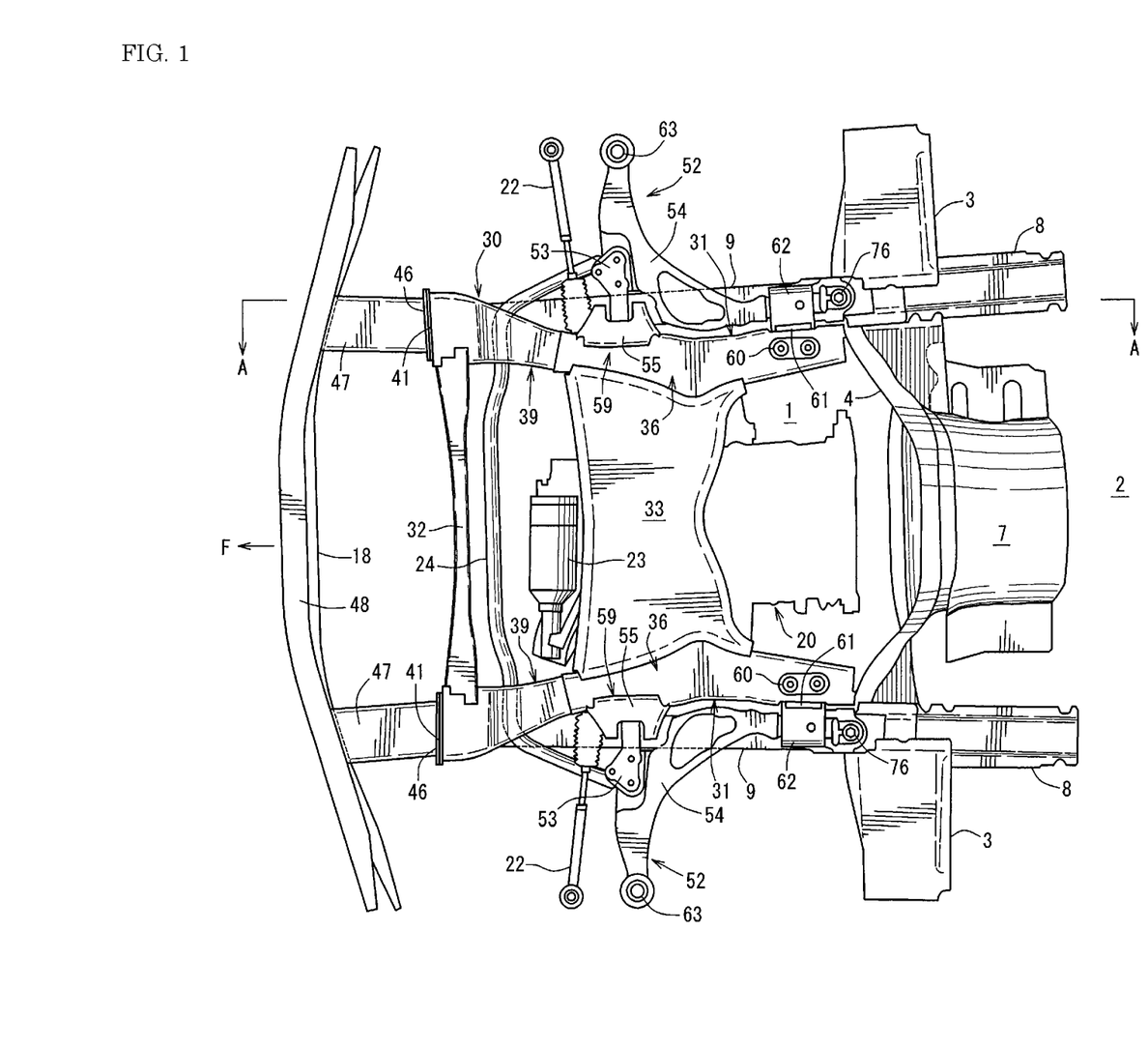
FIG. 1 is a bottom view of a front vehicle body structure including a subframe structure of a front suspension of the present disclosure.
Figure 2:
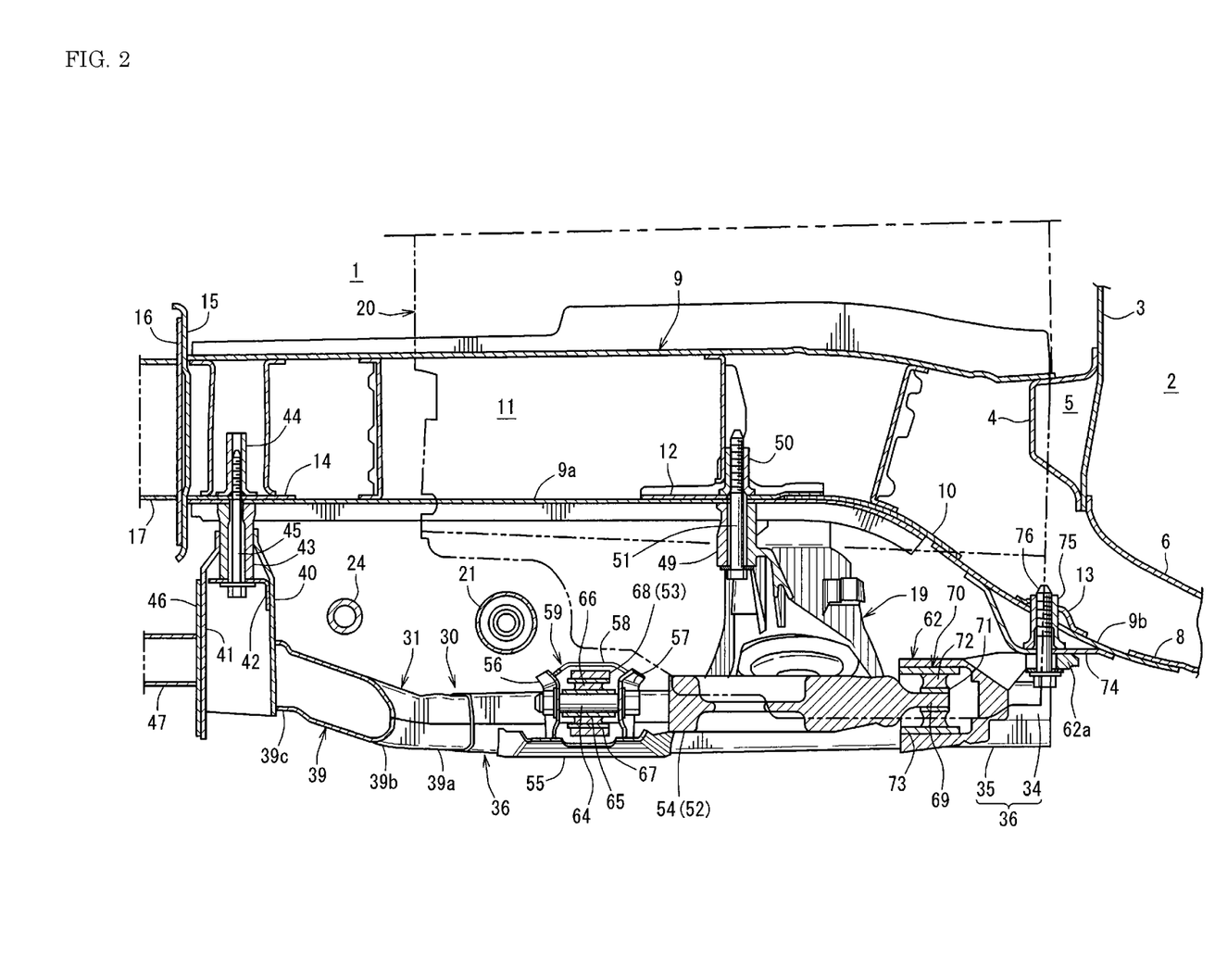
Figure 3:
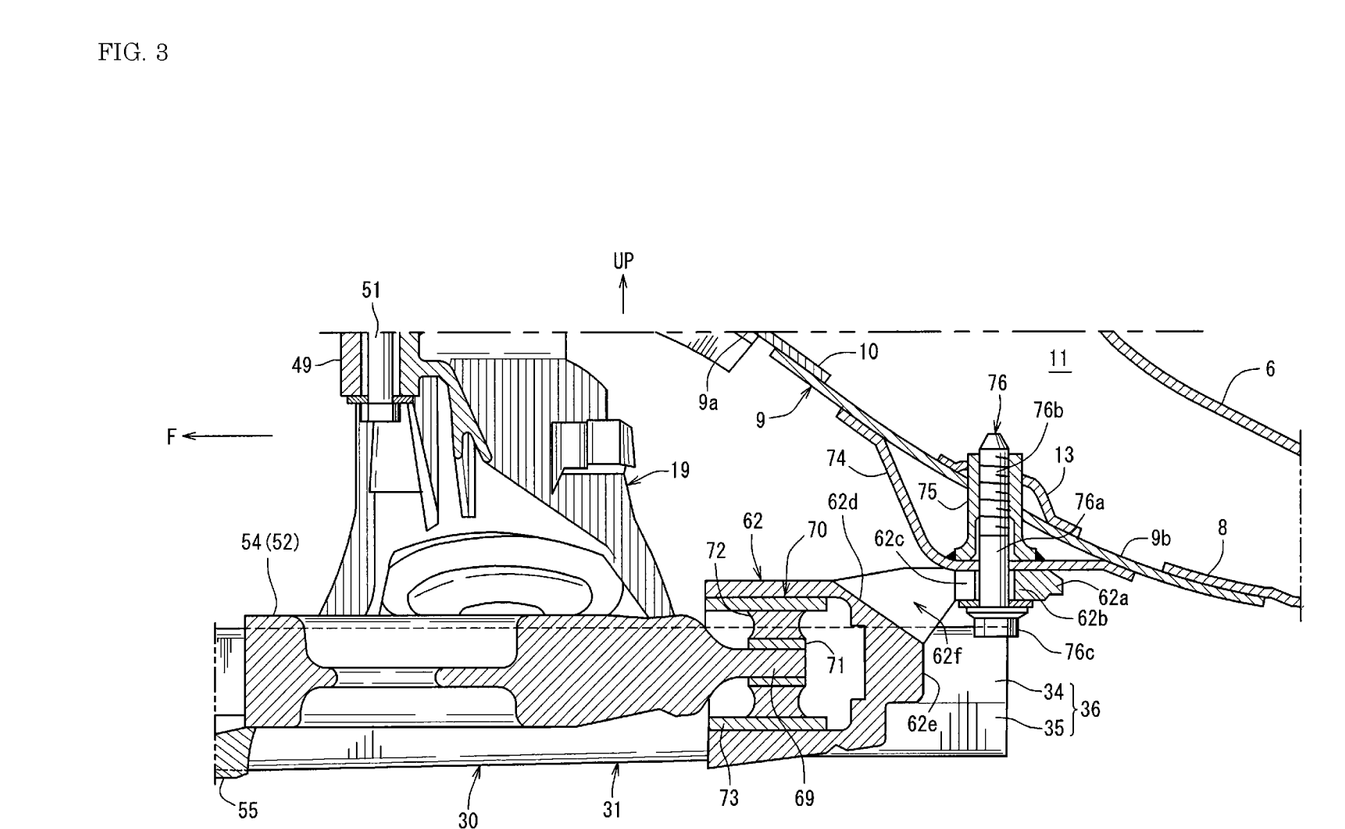
FIG. 3 is a main-part-enlarged cross-sectional view of FIG. 2.
Figure 4A:
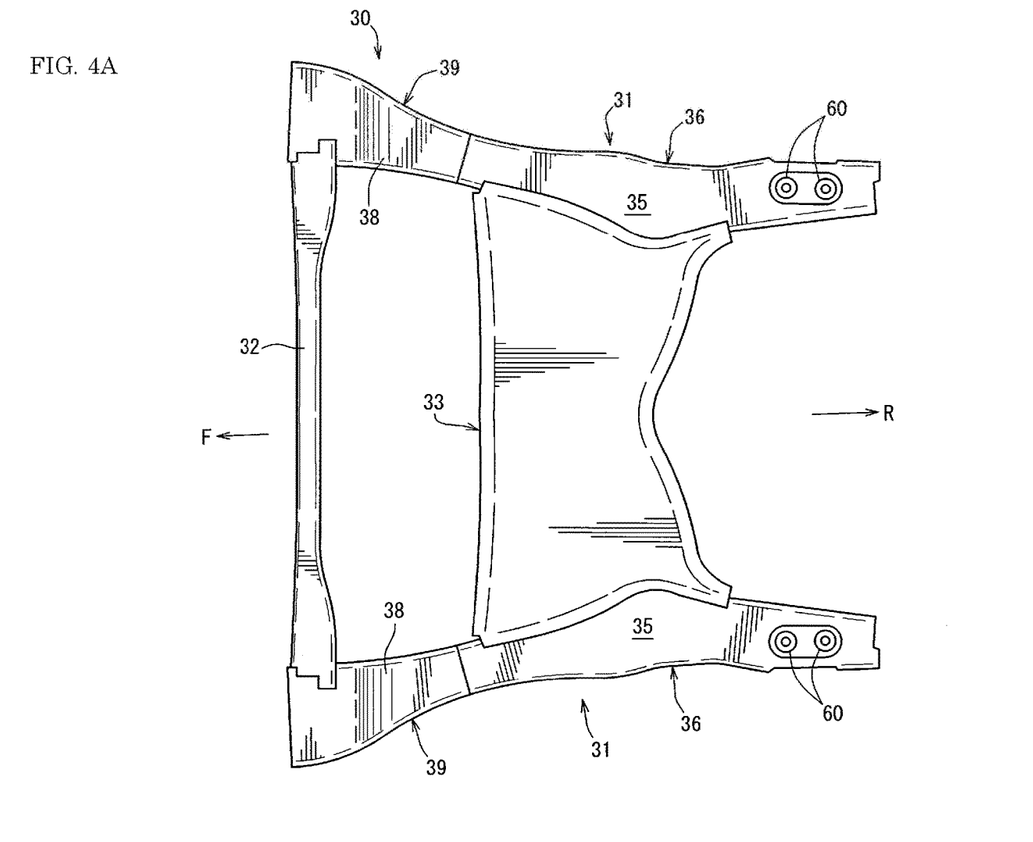
FIG. 4A is a bottom view of a subframe and FIG. 4B is a side view of the subframe.
Figure 4B:
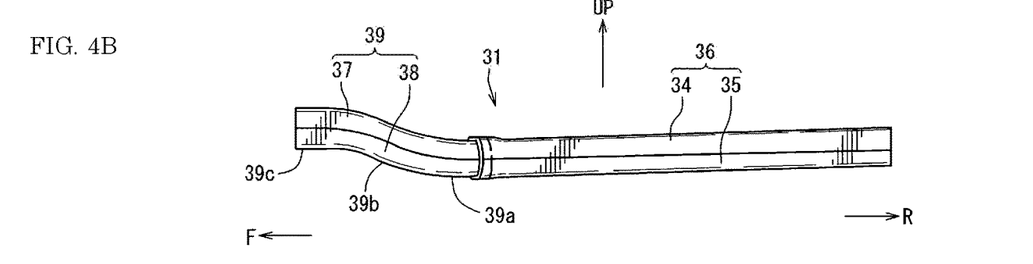
Figure 5:
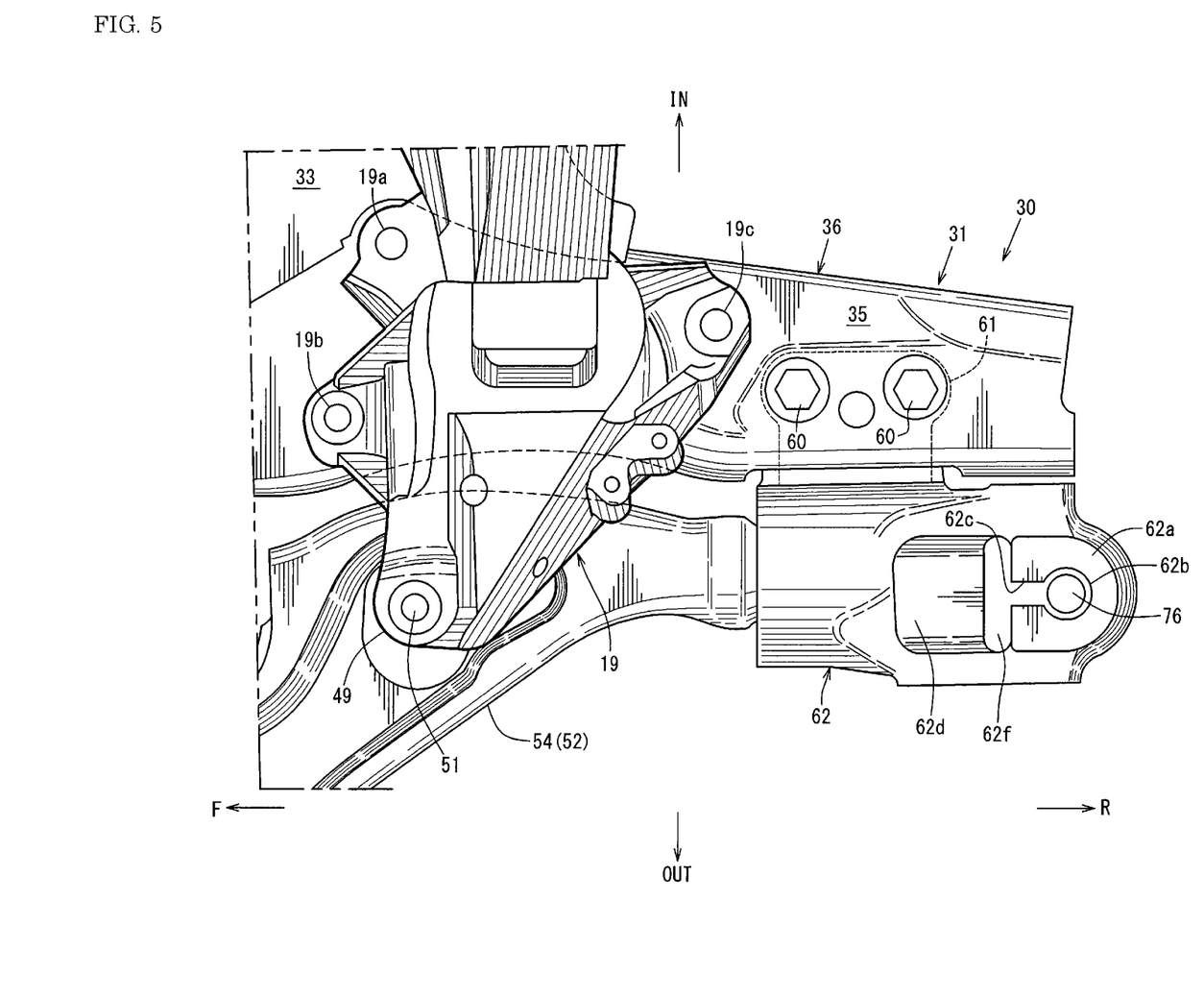
FIG. 5 is a plan view of a main part illustrating the subframe structure of the front suspension.

One embodiment of the present disclosure is described in detail with reference to the following drawings below. The drawings illustrate a subframe structure of a front suspension. FIG. 1 is a bottom view of a front vehicle body structure including the subframe structure, FIG. 2 is an arrow cross-sectional view of a main part taken along line A-A in FIG. 1, and FIG. 3 is a main-part-enlarged cross-sectional view of FIG. 2. FIG. 4A is a bottom view of a subframe, FIG. 4B is a side view of the subframe, and FIG. 5 is a plan view of a main part illustrating the subframe structure of the front suspension.

As illustrated in FIG. 1 and FIG. 2, a dash lower panel 3 that separates an engine room 1 (however, a motor room for a case of an electrically driven vehicle) and a vehicle interior 2 from each other in the front-rear direction is provided. A dash cross member 4 extending in the vehicle width direction is joined and fixed to a front surface portion of the dash lower panel 3. A closed cross-section portion 5 extending in the vehicle width direction is formed between the dash cross member 4 and the dash lower panel 3 described above.

As illustrated in FIG. 2, a floor panel 6 forming a floor surface of the vehicle interior 2 is provided on a lower portion of the dash lower panel 3 described above in a continuous manner. As illustrated in FIG. 1, a tunnel portion 7 protruding into the vehicle interior 2 is provided on a central portion of the dash lower panel 3 and the floor panel 6 described above in the vehicle width direction.

As illustrated in FIG. 1, floor frames 8 serving as vehicle body rigidity members extending in the vehicle front-rear direction are joined and fixed to a lower portion of the floor panel 6. As illustrated in FIG. 1 and FIG. 2, front side frames 9 extending to the vehicle front side from the dash lower panel 3 and the dash cross member 4 described above are provided. The front side frames 9 are vehicle body strengthening members extending in the vehicle front-rear direction on both of left and right sides of the engine room 1.

As illustrated in FIG. 2, each of the front side frames 9 is formed so as to be separated into a front frame portion 9a and a rear frame portion 9b. A rear portion of the front frame portion 9a and a front portion of the rear frame portion 9b are connected to each other by a connecting frame 10. As illustrated in FIG. 2, each of the front side frames 9 described above includes a closed cross-section portion 11 extending in the vehicle front-rear direction. In the closed cross-section portion 11, a place between an intermediate portion of the front frame portion 9a in the front-rear direction and a front portion of the connecting frame 10 is reinforced by a reinforcement 12.

As illustrated in FIG. 2, a reinforcement 13 is provided on a surface of the rear frame portion 9b of the front side frame 9 on the closed cross-section portion 11 side thereof so as to correspond to a fastening position of a rear portion (in detail, a rear portion of a suspension arm mounting bracket 62) of a subframe 30 described below.

As illustrated in FIG. 2, a reinforcement 14 is also provided on a surface of a front end of the front frame portion 9a of the front side frame 9 on the closed cross-section portion 11 side thereof so as to correspond to a fastening position of a front portion of the front subframe 30 described below.

As illustrated in FIG. 2, a main crash can 17 is mounted on a front end of the front side frame 9 via a set plate 15 and a mounting plate 16. As illustrated in FIG. 1, a main bumper beam 18 extending in the vehicle width direction is mounted between the pair of left and right main crash cans 17 and 17.

As illustrated in FIG. 1, the subframe 30 (in detail, the front subframe) is disposed on lower portions of the pair of left and right front side frames 9 and 9. As illustrated in FIG. 2, the subframe 30 is fastened to and supported by lower surface portions of the front side frames 9 with use of a plurality of fastening members described below. The subframe 30 supports an engine 20 that is a vehicle driving apparatus via a mounting bracket 19 in a mounting manner. As illustrated in FIG. 5, the mounting bracket 19 is mounted on the subframe 30 with use of a plurality of mounting portions 19a, 19b, and 19c. In this embodiment, the engine 20 described above is disposed in a vertically installed manner so that a cylinder array is placed along the vehicle front-rear direction.

As the subframe 30 is illustrated in FIGS. 4A and 4B, the subframe 30 includes a pair of left and right front-rear frames 31 and 31 extending in the vehicle front-rear direction, a transverse member 32, and a center member 33. The transverse member 32 connects front ends of the pair of left and right front-rear frames 31 and 31 to each other in the vehicle width direction. The center member 33 connects intermediate portions of the pair of left and right front-rear frames 31 and 31 in the longitudinal direction to each other in the vehicle width direction.

The transverse member 32 described above has a closed cross-section portion extending in the vehicle width direction by a combination of an upper member and a lower member.

The center member 33 described above also has a closed cross-section portion extending in the vehicle width direction by a combination of an upper member and a lower member.

As illustrated in FIG. 4B, each of the front-rear frames 31 described above includes a main body 36 having a closed cross-section portion extending in the vehicle front-rear direction by a combination of an upper member 34 and a lower member 35, and an extending portion 39 having a closed cross-section portion extending in the vehicle front-rear direction by a combination of an upper member 37 and a lower member 38.

As illustrated in FIGS. 4A and 4B, the extending portion 39 described above extends from a front end of the main body 36 to the vehicle front side. The extending portion 39 includes a rear horizontal portion 39a formed to be substantially horizontal, an inclined portion 39b extending from a front end thereof toward the upper front side, and a front horizontal portion 39c horizontally extending from a front end thereof to the vehicle front side.

As illustrated in FIG. 2, a rear end of the front horizontal portion 39c is disposed so as to be positioned to be closer to the vehicle front side than a front end of the engine 20 disposed in a vertically installed manner. As a result, at the time of a vehicle frontal collision, a front portion of the subframe 30 that is closer to the front side than the engine 20 is bent into a Z-shape in a vehicle side view, to thereby absorb collision energy (see FIGS. 7A-7D).

The magnitude relationship of the strengths between the upper members 34 and 37 and the lower members 35 and 38 illustrated in FIG. 4B is set as follows. Put plainly, the strength of the lower member 38 of the extending portion 39 is relatively the lowest, and the strength of the upper member 37 of the extending portion 39 is set to be higher than the strength of the lower member 38. The strengths of the upper member 34 and the lower member 35 of the main body 36 are set to be even higher than the strength of the upper member 37. Note that the strengths of the upper member 34 and the lower member 35 of the main body 36 are set to be equal. The magnitude relationship of the strengths as above can be set as described above in accordance with the selection of the material forming the members and the plate thickness thereof. By the magnitude relationship of the strengths described above, the Z-shaped bending of the front portion of the subframe 30 in a vehicle side view at the time of a vehicle frontal collision is achieved in an even more secure manner.

As illustrated in FIG. 2, a pair of front and rear mounting members 40 and 41 are joined and fixed to a front end of the extending portion 39 forming the front-rear frame 31 of the subframe 30. The mounting members 40 and 41 extend from the front end of the extending portion 39 to the upper side, and an L-shaped bracket 42 is joined and fixed to a front surface portion of the mounting member 40 on the rear side.

A cylindrical shaft-like spacer 43 is vertically fixed to an upper surface portion of the bracket 42 described above, upper ends of the mounting members 40 and 41 described above are caused to abut against the outer periphery of the spacer 43, and the outer periphery of the spacer 43 and the upper ends of the mounting members 40 and 41 described above are fixed to each other by welding.

As illustrated in FIG. 2, a weld nut 44 is vertically fixed to the upper surface of the reinforcement 14 of the front side frame 9 facing the spacer 43 described above in the up-down direction. The front portion of the subframe 30 is mounted on the front side frame 9 with use of a bolt 45 serving as a fastening member screwed into the weld nut 44 described above via the spacer 43 from the lower side of the bracket 42.

As illustrated in FIG. 1 and FIG. 2, sub crash cans 47 are mounted on the front portion of the mounting member 41 on the front side via mounting plates 46, and a sub bumper beam 48 extending in the vehicle width direction is mounted between the pair of left and right sub crash cans 47 and 47.

As illustrated in FIG. 2, on the mounting bracket 19 described above, a cylindrical shaft-like spacer 49 extending from an outer portion thereof in the vehicle width direction to the upper side is formed. A weld nut 50 is vertically fixed to the upper surface of the reinforcement 12 of the front side frame 9 facing the spacer 49 in the up-down direction.

An intermediate portion of the subframe 30 in the front-rear direction is mounted on the front side frame 9 via the mounting bracket 19 with use of a bolt 51 serving as a fastening member screwed into the weld nut 50 described above via the spacer 49 from the lower side of the spacer 49 described above.

Incidentally, as illustrated in FIG. 1, lower arms 52 serving as suspension arms from which front wheels are suspended are provided. The subframe 30 described above supports the engine 20 in a mounting manner, and axially supports the lower arms 52. Each of the lower arms 52 described above is an A-type arm obtained by integrally forming a front arm portion 53 made by aluminum die casting and a rear arm portion 54 made by aluminum die casting.

As illustrated in FIG. 2, a suspension arm mounting bracket 59 formed by a lower bracket 55, a front bracket 56, a rear bracket 57, and an upper bracket 58 is joined and fixed to the main body 36 of the front-rear frame 31 in the subframe 30 described above. A base end of the front arm portion 53 is axially supported by the suspension arm mounting bracket 59 (hereinafter referred to as a front arm mounting bracket 59) serving as an axially supporting portion.

As illustrated in FIG. 1 and FIG. 5, a connecting bracket 61 is mounted on a rear portion of the main body 36 of each of the front-rear frames 31 with use of fastening members 60 such as a bolt and a nut, and the suspension arm mounting bracket 62 made by aluminum die casting is connected to the connecting bracket 61.

A rear portion of the rear arm portion 54 in the lower arm 52 described above is axially supported by the suspension arm mounting bracket 62 (hereinafter referred to as a rear arm mounting bracket 62) serving as an axially supporting portion.

As illustrated in FIG. 1, the front arm portions 53 described above are arm portions linearly extending in the vehicle width direction. Each of the rear arm portions 54 extends to the vehicle-width-direction outer side so as to curve in an arc shape from a rear portion to a front portion thereof. Knuckle supporting portions 63 are provided on vehicle-width-direction outer ends of the rear arm portions 54. As illustrated in FIG. 1 and FIG. 2, the rear arm mounting bracket 62 described above is formed so as to be positioned directly below the rear frame portion 9b of the front side frame 9.

As illustrated in FIG. 2, an inner pivot shaft 64 is mounted between the front bracket 56 and the rear bracket 57 in the front arm mounting bracket 59. An arm bush 68 is disposed on the outer periphery of the inner pivot shaft 64 via a cylinder 65, rubber 66, and an external cylinder 67. The arm bush 68 is a bush integrally formed on a base end of the front arm portion 53 described above.

As illustrated in FIG. 2, a pivot shaft 69 extending in the vehicle front-rear direction is integrally formed on a rear end of the rear arm portion 54, and the pivot shaft 69 is supported by the rear arm mounting bracket 62 via an arm bush 70.

As illustrated in FIG. 2 and FIG. 3, the arm bush 70 described above includes an inner cylinder 71, rubber 72, and an external cylinder 73. In other words, a rear portion of the rear arm portion 54 of the lower arm 52 is supported by the rear arm mounting bracket 62 in which the arm bush 70 is fitted.

As illustrated in FIG. 1 and FIG. 5, the inner side of the rear arm mounting bracket 62 in the vehicle width direction is mounted on the main body 36 of the front-rear frame 31 of the subframe 30 via the connecting bracket 61. An inner portion of the connecting bracket 61 described above in the vehicle width direction is fastened to the main body 36 with use of the fastening members 60. An outer portion of the connecting bracket 61 in the vehicle width direction abuts against the external cylinder 73 described above via a hole portion (not shown) formed in the rear arm mounting bracket 62. The outer portion of the connecting bracket 61 in the vehicle width direction is fixed to the external cylinder 73 by welding.

As illustrated in FIG. 2 and FIG. 3, a rear portion of the subframe 30, in detail, a rear portion 62a of the rear arm mounting bracket 62 mounted on the subframe 30 is mounted on a lower portion of the front side frame 9 serving as a vehicle body.

In detail, an upper surface of the rear frame portion 9b of the front side frame 9 facing the rear portion 62a of the rear arm mounting bracket 62 described above in the up-down direction is joined and fixed to the reinforcement 13 described above. A subframe mounting seat 74 is joined and fixed to a lower surface of the rear frame portion 9b (see FIG. 2 and FIG. 3).

As illustrated in FIG. 3, a weld nut 75 is fixed to a horizontal portion of the subframe mounting seat 74 described above by welding. The weld nut 75 is vertically provided toward the upper side from the horizontal portion of the subframe mounting seat 74, and the weld nut 75 is provided so as to protrude to a place above the reinforcement 13 via the rear frame portion 9b.

The rear portion 62a of the rear arm mounting bracket 62 is mounted on the lower portion of the front side frame 9 with use of a bolt 76 (fastening member) screwed into the weld nut 75 via the subframe mounting seat 74 from a place below the rear portion 62a of the rear arm mounting bracket 62.

Figure 6:
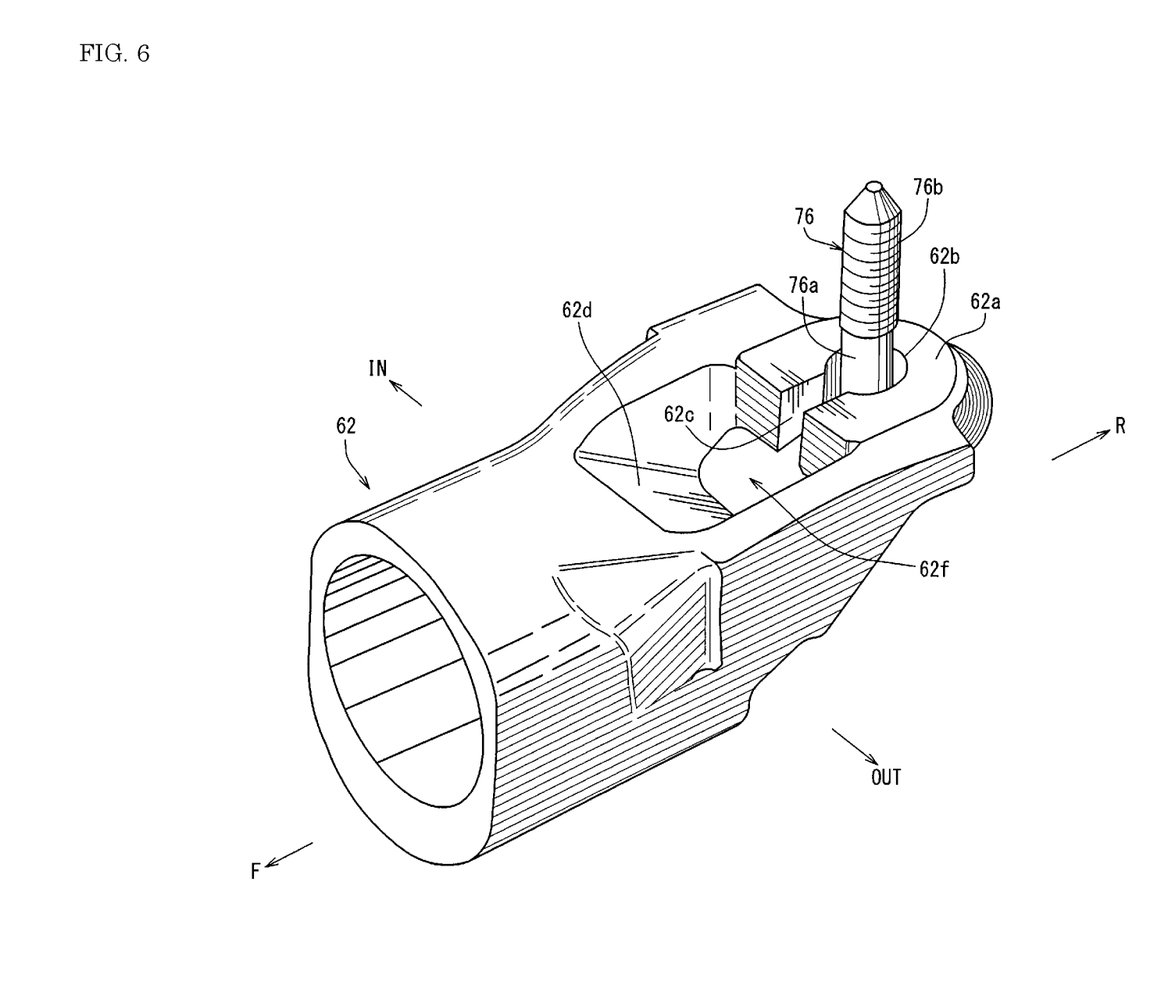
FIG. 6 is a perspective view of a suspension arm mounting bracket.

FIG. 6 is a perspective view of the rear arm mounting bracket 62. As illustrated in FIG. 3, FIG. 5, and FIG. 6, the fastening between the subframe 30 and the fastening member (the fastening between the rear arm mounting bracket 62 and the bolt 76) is configured such that the rear portion 62a of the rear arm mounting bracket 62 is separated from the bolt 76 when a collision load to the vehicle rear side is applied to the subframe 30.

The bolt 76 described above is fastened to the front side frame 9 on the vehicle body side in an inseparable manner. The bolt 76 described above is fastened to the rear arm mounting bracket 62 on the subframe 30 side in a separable manner via a slit portion 62c provided on the front side of the bolt 76.

In detail, as illustrated in FIG. 3, in the bolt 76, a shaft portion 76a, a screw portion 76b positioned on an upper portion of the shaft portion 76a, and a head portion 76c positioned on a lower portion of the shaft portion 76a are integrally formed. As illustrated in FIG. 5 and FIG. 6, an opening of a bolt insertion hole 62b of which inner diameter is greater than outer diameters of the shaft portion 76a and the screw portion 76b of the bolt 76 is formed in the rear portion 62a of the rear arm mounting bracket 62.

As illustrated in FIG. 5 and FIG. 6, the slit portion 62c described above is provided on the front side of the shaft portion 76a of the bolt 76, and a rear end of the slit portion 62c communicates with the bolt insertion hole 62b. The width of the slit portion 62c in the vehicle width direction is set to a width with which the shaft portion 76a of the bolt 76 can be relatively moved to a front side while the slit portion 62c is plastically deformed when a frontal collision load is input. As a result, when the collision load is input, the rear portion 62a of the rear arm mounting bracket 62 comes off from the shaft portion 76a of the bolt 76.

Figure 9:
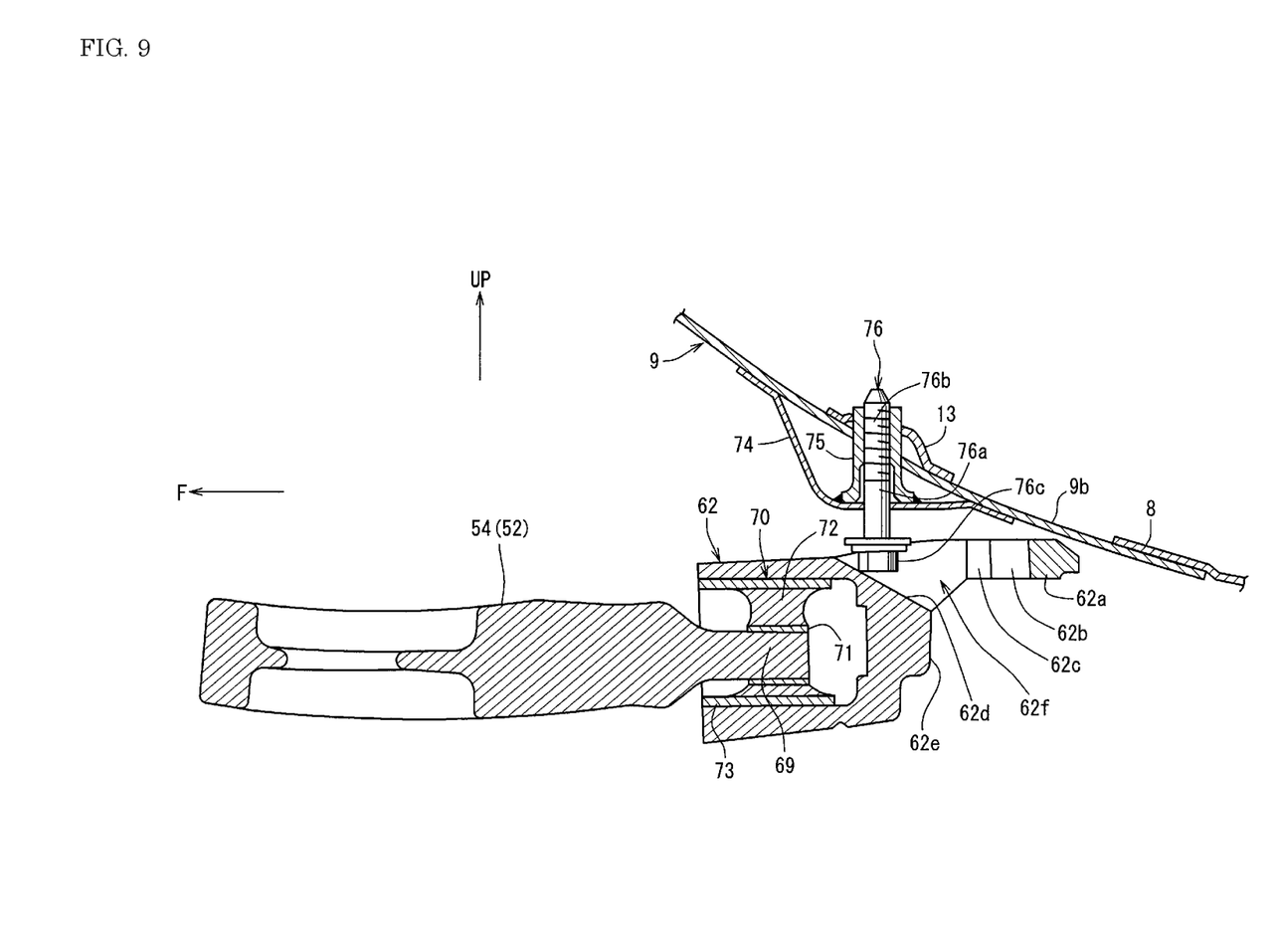
FIG. 9 is an explanatory view illustrating the leading of the suspension arm mounting bracket to the lower side at the time of a collision.

As illustrated in FIG. 3, a leading guide portion 62d that abuts against the head portion 76c of the bolt 76 and leads the rear arm mounting bracket 62 to the lower side as illustrated in FIG. 9 after the rear portion 62a of the rear arm mounting bracket 62 is separated from the bolt 76 is integrally formed on the rear arm mounting bracket 62.

As illustrated in FIG. 3, the leading guide portion 62d is provided on the front side of the head portion 76c of the bolt 76. The leading guide portion 62d is inclined to the lower rear side so as to abut against the head portion 76c of the bolt 76 and lead the rear arm mounting bracket 62 to the lower side after the rear portion 62a comes off from the bolt 76. In this embodiment, the leading guide portion 62d is inclined to the lower rear side at 35 degrees with respect to an upper surface of the rear arm mounting bracket 62, but the inclination angle of the leading guide portion 62d may be any angle as long as the angle is within the range of from 35 degrees to 45 degrees. In the rear portion 62a of the rear arm mounting bracket 62 described above, a bolt insertion hole 62b that is a portion in which the fastening member (the bolt 76) for the rear portion 62a with respect to the vehicle body is disposed and the leading guide portion 62d are integrally formed.

In a normal state (a state in which the collision load is not input) illustrated in FIG. 3, the height position of a lower end of the head portion 76c of the bolt 76 is positioned above the height position of a lower end of the leading guide portion 62d. In other words, a raised wall 62e extending to the lower side from the lower end is integrally formed on the lower end of the leading guide portion 62d. The height relationship is set because an expected effect cannot be secured if the head portion 76c of the bolt 76 abuts against the raised wall 62e after the rear portion 62a comes off from the bolt 76.

As illustrated in FIG. 3, FIG. 5, and FIG. 6, the leading guide portion 62d described above is formed such that an opening 62f is placed between the leading guide portion 62d and a portion of the bolt 76 positioned below a horizontal portion of the subframe mounting seat 74. As a result, a separation space for the portion of the bolt 76 is secured.

In FIG. 1 and FIG. 2, reference numeral 21 denotes a steering rack portion of a steering apparatus, reference numeral 22 denotes a tie rod, reference numeral 23 denotes an assist motor for power steering, and reference numeral 24 denotes a stabilizer serving as a torsion bar spring provided between the left and right lower arms 52 and 52. In the drawings, arrow F indicates the vehicle front side, arrow R indicates the vehicle rear side, arrow IN indicates the inner side in the vehicle width direction, arrow OUT indicates the outer side in the vehicle width direction, and arrow UP indicates the vehicle upper side.

Figure 7A:
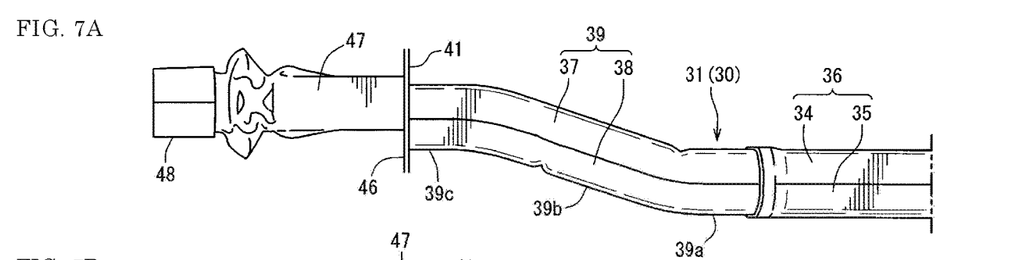
FIG. 7A to FIG. 7D are side views illustrating deformation states of the subframe at the time of a full-overlap collision.

The effect of the subframe structure of the front suspension configured as described above is described below. FIG. 7A to FIG. 7D are side views illustrating deformation states of the sub bumper beam 48, the sub crash can 47, and the subframe 30 at the time of a full-overlap collision (at the time of a frontal collision). As illustrated in FIG. 7A, when the frontal collision load (the collision load to the vehicle rear side) is input to the sub bumper beam 48, the front portion of the sub crash can 47 is crushed by axial compression.

Figures 7B, 7C, 7D:
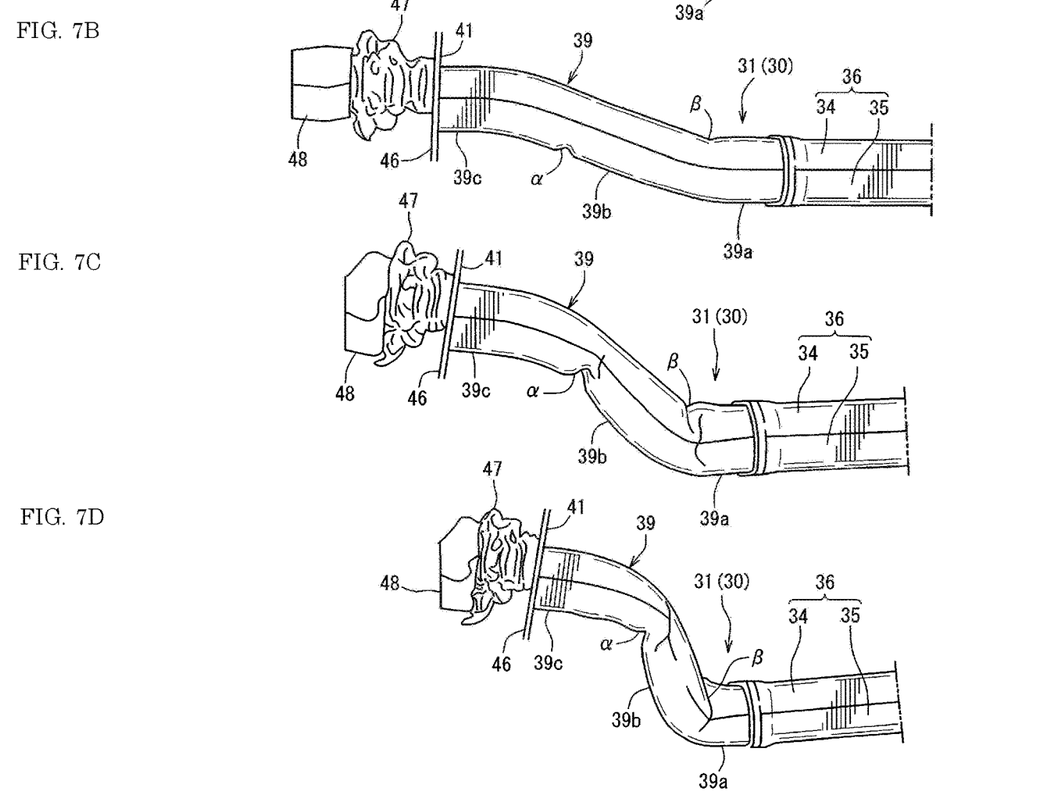

When the frontal collision further proceeds, the sub crash can 47 is crushed across the full length thereof in the front-rear direction, and bending starting point portions α and β for Z-shaped bending are formed on a lower front portion and an upper rear portion of the inclined portion 39b of the subframe 30 as illustrated in FIG. 7B.

When the frontal collision further proceeds, bending deformation is performed such that the front side of the inclined portion 39b rises to the upper side and the rear side with use of the bending starting point portions α and β described above as fulcrums as illustrated in FIG. 7C.

When the frontal collision further proceeds, the extending portion 39 is bent to a Z-shape in a side view, and absorbs the frontal collision energy as illustrated in FIG. 7D. At this time, the main body 36 in the front-rear frame 31 of the subframe 30 is displaced to the lower front side by from about 5 degrees to about 7 degrees.

Figure 8:
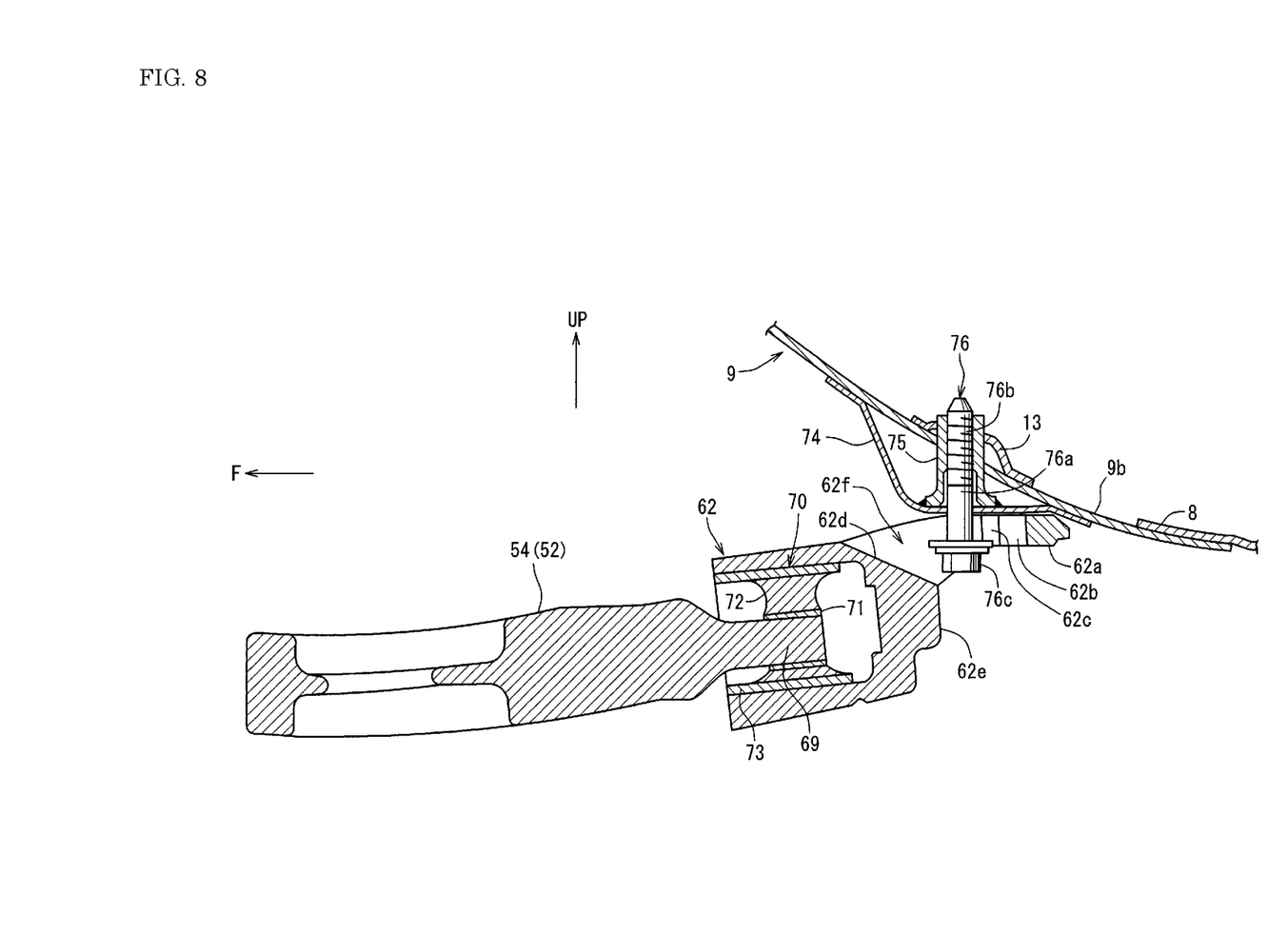
FIG. 8 is an explanatory view illustrating the separation of the suspension arm mounting bracket from a fastening member at the time of a collision.

FIG. 8 is an explanatory view illustrating the separation of the rear arm mounting bracket 62 from the bolt 76 at the time of a collision, and FIG. 9 is an explanatory view illustrating the leading of the rear arm mounting bracket 62 to the lower side at the time of a collision. When the collision load (frontal collision load) to the vehicle rear side is applied to the subframe 30 from the normal state illustrated in FIG. 3, the load is transmitted to the rear arm mounting bracket 62 connected to a vehicle-width-direction outer side of the rear portion of the subframe 30. As a result, the rear arm mounting bracket 62 moves to the vehicle rear side together with the subframe 30.

In this case, the fastening state of the bolt 76 to the front side frame 9 side is maintained. When the rear arm mounting bracket 62 moves to the rear side, the bolt 76 relatively moves to a front side via the slit portion 62c. As a result, the bolt 76 is separated to the opening 62f on the front side of the slit portion 62c. As a result, as illustrated in FIG. 8, the rear portion 62a of the rear arm mounting bracket 62 comes off from the bolt 76.

After the separation between the rear portion 62a of the rear arm mounting bracket 62 and the bolt 76, the rear arm mounting bracket 62 is led to the lower side by the abutment of the leading guide portion 62d inclined to the lower rear side against the head portion 76c of the bolt 76 as illustrated in FIG. 9.

As a result, the rear portion of the subframe 30 connected to the rear arm mounting bracket 62 is led to the lower side, the engine 20 falls to the lower side together with the subframe 30, and excessive load transmission to the dash lower panel 3 is suppressed.

As described above, in the subframe structure of the front suspension of the embodiment described above, the subframe 30 that supports the vehicle driving apparatus (see the engine 20) in a mounting manner is provided, the rear portion (see the rear arm mounting bracket 62) of the subframe 30 is mounted on the lower portion of the vehicle body (the front side frame 9) via the fastening member (see the bolt 76), the fastening between the subframe 30 and the fastening member (the bolt 76) is configured such that the rear portion (see the rear arm mounting bracket 62) of the subframe 30 is separated when the collision load to the vehicle rear side is applied to the subframe 30, and the leading guide portion 62d that abuts against the fastening member (the bolt 76) and leads the subframe 30 to the lower side after the separation from the fastening member (the bolt 76) is integrally formed on the rear portion (see the rear arm mounting bracket 62) of the subframe 30 (see FIG. 2, FIG. 3, and FIG. 9).

According to this configuration, when the collision load to the vehicle rear side is applied to the subframe 30, the rear portion (see the rear arm mounting bracket 62) of the subframe 30 is separated from the fastening member (the bolt 76). After the separation of the rear portion, the leading guide portion 62d abuts against the fastening member (the bolt 76) and leads the subframe 30 to the lower side, and hence the vehicle driving apparatus (see the engine 20) falls to the lower side together with the subframe 30.

Therefore, the excessive load transmission to the dash panel at the time of a vehicle frontal collision can be suppressed by leading the vehicle driving apparatus to the lower side together with the subframe 30 after the separation of the rear portion of the subframe 30 without increasing the weight and the number of parts even when the rear portion of the subframe 30 is not mounted on the inclined portion of the body.

In one embodiment of the present disclosure, the fastening member (the bolt 76) is fastened to the vehicle body (see the front side frame 9) side in an inseparable manner and is fastened to the subframe 30 side via the slit portion 62c provided on the front side of the fastening member (the bolt 76) in a separable manner, and the leading guide portion 62d that abuts against the fastening member (the bolt 76) and is inclined to the lower rear side is integrally formed on the front side of the fastening member (the portion of the bolt 76 below the horizontal portion of the subframe mounting seat 74) on the subframe 30 side (see FIG. 3, FIG. 5, and FIG. 6).

According to this configuration, the fastening state of the fastening member (the bolt 76) to the vehicle body (the front side frame 9) side is maintained at the time of a vehicle frontal collision. When the rear portion of the subframe 30 moves to the rear side, the fastening member (the bolt 76) relatively moves to a front side via the slit portion 62*c*, and is separated from the rear portion of the subframe 30. As a result, the rear portion of the subframe 30 comes off from the fastening member (the bolt 76).

After the separation between the rear portion of the subframe 30 and the fastening member (the bolt 76), the subframe 30 is led to the lower side by the abutment of the leading guide portion 62*d* inclined to the lower rear side against the fastening member (the bolt 76). As described above, the facilitation of the separation of the rear portion of the subframe 30 from the fastening member (the bolt 76) by the slit portion 62*c*, and the facilitation of the abutment of the fastening member (the bolt 76) against the leading guide portion 62*d* can be compatible.

In one embodiment of the present disclosure, the leading guide portion 62*d* is formed such that the opening 62*f* is placed between the leading guide portion 62*d* and the fastening member (the bolt 76) on the subframe 30 side (see FIG. 3, FIG. 5, and FIG. 6). According to this configuration, by the formation of the opening 62*f*, the necessary space needed when the fastening member (the bolt 76) is separated from the rear portion of the subframe 30 via the slit portion 62*c* can be secured. Therefore, the relative front side movement of the fastening member (the bolt 76) can be secured, and the weight of the subframe 30 can be saved by the formation of the opening 62*f*.

In one embodiment of the present disclosure, the lower arm 52 from which the front wheel is suspended is provided, the rear portion of the lower arm 52 is supported by the suspension arm mounting bracket (see the rear arm mounting bracket 62) in which the bush (see the arm bush 70) is fitted, the vehicle-width-direction inner side of the suspension arm mounting bracket (the rear arm mounting bracket 62) is mounted on the subframe 30, and the portion (see the bolt insertion hole 62*b*) in which the fastening member (the bolt 76) for the rear portion of the subframe 30 with respect to the vehicle body (see the front side frame 9) is disposed and the leading guide portion 62*d* are integrally formed on the rear portion of the suspension arm mounting bracket (the rear arm mounting bracket 62) (see FIG. 1, FIG. 3, FIG. 5, and FIG. 6).

According to this configuration, the portion (the bolt insertion hole 62*b*) in which the fastening member (the bolt 76) is disposed and the leading guide portion 62*d* are integrally formed on the rear portion of the suspension arm mounting bracket (the rear arm mounting bracket 62). Therefore, the portion (the bolt insertion hole 62*b*) in which the fastening member (the bolt 76) is disposed and the leading guide portion 62*d* can be formed without causing the subframe 30 itself to become complicated.

Regarding the correspondence between the configuration of the present disclosure and the embodiment described above, the vehicle driving apparatus of the present disclosure corresponds to the engine 20 disposed in a vertically installed manner (so-called longitudinal engine) of the embodiment. Similarly, the fastening member corresponds to the bolt 76. The vehicle body corresponds to the front side frame 9. The bush corresponds to the arm bush 70. The suspension arm mounting bracket corresponds to the rear arm mounting bracket 62. The portion in which the fastening member is disposed corresponds to the bolt insertion hole 62*b*, but the present disclosure is not limited to the configuration of the embodiment described above.

For example, the vehicle driving apparatus may be a motor unit of an electrically driven vehicle instead of the engine 20.

As described above, the present disclosure is useful for a subframe structure of a front suspension in which a front subframe that supports a vehicle driving apparatus such as an engine in a mounting manner is provided, and a rear portion of the front subframe is mounted to a lower portion of a vehicle body via a fastening member.

What is claimed is:

1. A subframe structure of a front suspension, the subframe structure comprising:
   a subframe that supports a vehicle driving apparatus in a mounting manner,
   a rear portion of the subframe that is mounted on a lower portion of a vehicle body via a fastening member, and fastening between the subframe and the fastening member is configured such that the rear portion of the subframe is separated when a collision load to a vehicle rear side is applied to the subframe, and
   a leading guide portion that abuts against the fastening member and leads the subframe to a lower side after separation from the fastening member is integrally formed on the rear portion of the subframe, wherein
   the fastening member is fastened to a vehicle body side in an inseparable manner and is fastened to a subframe side in a separable manner via a slit portion provided on a front side of the fastening member, and
   the leading guide portion that abuts against the fastening member and is inclined to a lower rear side is integrally formed on a front side of the fastening member on the subframe side.

2. The subframe structure of the front suspension according to claim 1, wherein the leading guide portion is formed such that an opening is placed between the leading guide portion and the fastening member on the subframe side.

3. The subframe structure of the front suspension according to claim 2, further comprising:
   a lower arm from which a front wheel is suspended, wherein
   the lower arm has a rear portion supported by a suspension arm mounting bracket in which a bush is fitted,
   a vehicle-width-direction inner side of the suspension arm mounting bracket is mounted to the subframe, and
   the suspension arm mounting bracket has a rear portion on which a portion in which the fastening member for the rear portion of the subframe with respect to the vehicle body is disposed and the leading guide portion are integrally formed.

4. The subframe structure of the front suspension according to claim 1, further comprising:
   a lower arm from which a front wheel is suspended, wherein
   the lower arm has a rear portion supported by a suspension arm mounting bracket in which a bush is fitted,
   a vehicle-width-direction inner side of the suspension arm mounting bracket is mounted to the subframe, and
   the suspension arm mounting bracket has a rear portion on which a portion in which the fastening member for the rear portion of the subframe with respect to the vehicle body is disposed and the leading guide portion are integrally formed.

5. The subframe structure of the front suspension according to claim 1, further comprising:
a lower arm from which a front wheel is suspended, wherein
the lower arm has a rear portion supported by a suspension arm mounting bracket in which a bush is fitted,
a vehicle-width-direction inner side of the suspension arm mounting bracket is mounted to the subframe, and
the suspension arm mounting bracket has a rear portion on which a portion in which the fastening member for the rear portion of the subframe with respect to the vehicle body is disposed and the leading guide portion are integrally formed.

\* \* \* \* \*